United States Patent [19]
Bingler

[11] 3,965,606
[45] June 29, 1976

[54] FISHING LURE

[76] Inventor: Donald J. Bingler, 4750 Bedford Ave., Brooklyn, N.Y. 11235

[22] Filed: Jan. 14, 1975

[21] Appl. No.: 540,857

[52] U.S. Cl............................. 43/42.16; 43/42.24; 43/42.37; 43/42.39; 43/43.13
[51] Int. Cl.².......................................... A01K 85/00
[58] Field of Search............... 43/42.16, 42.1, 42.11, 43/42.24, 42.37, 43.13, 42.39

[56] References Cited
UNITED STATES PATENTS

| 2,219,983 | 10/1940 | Evenson | 43/43.13 X |
| 2,261,549 | 11/1941 | Hayes | 43/42.24 X |
| 3,855,722 | 12/1974 | Moore | 43/42.37 X |

FOREIGN PATENTS OR APPLICATIONS 95,396   1/1960   Norway.............................. 43/42.24

Primary Examiner—Hugh R. Chamblee
Assistant Examiner—Daniel J. Leach
Attorney, Agent, or Firm—Auslander & Thomas

[57] ABSTRACT

A lure with a weighted head and a tail rotatably secured thereto which gives the optical illusion of a wriggling body. A ball chain swivel extends from the head and a hook is rotatably joined to the ball chain and has a sleeve surrounding at least part of the hook. The construction allows the lure to keep a good horizontal track in the water and also avoids torque twisting the line.

3 Claims, 6 Drawing Figures

FISHING LURE

The present invention relates to an improved fishing lure.

In the past, many fishing lures have been provided, simulating fish, simulating fish wriggling through water and lures have been provided with hooks extending from rubber tubing.

Lures simulating wriggling fish or worms, have in the past improved the wriggling illusion by having twisted bodies which tend to rotate in the water, giving an underwater appearance of wriggling.

Rubber tubing also has been found desirable as a useful expedient in making lures or bent lures simulating bait or wriggling fish.

Even ball chain has been employed as a connector and swivel, as disclosed in my patent application Ser. No. 795,829, now abandoned, for a fishing lure.

Lures of the past have not horizontally tracked under water enough. Even where rotating for a good simulated wriggle or even when actually rotating or actually undulating lures tended to be quickly drawn out of the water or failed to track much of an horizontal path. Horizontal movement more or less simulates the movement of swimming objects, not disturbed or in flight.

Rotating lures of the past have generally twisted the line, increasing the chances of tangles. Such twist came about even with the best swivels, since the torque of the rotation tended to carry through the lure to the line, notwithstanding swivels.

According to the present invention, a simple lure is provided, preferably of rubber tubing, rotatable to simulate wriggling and having long horizontal underwater tracking ability and diminished or eliminated twisting of line.

Although such novel feature or features believed to be characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Figure 1:
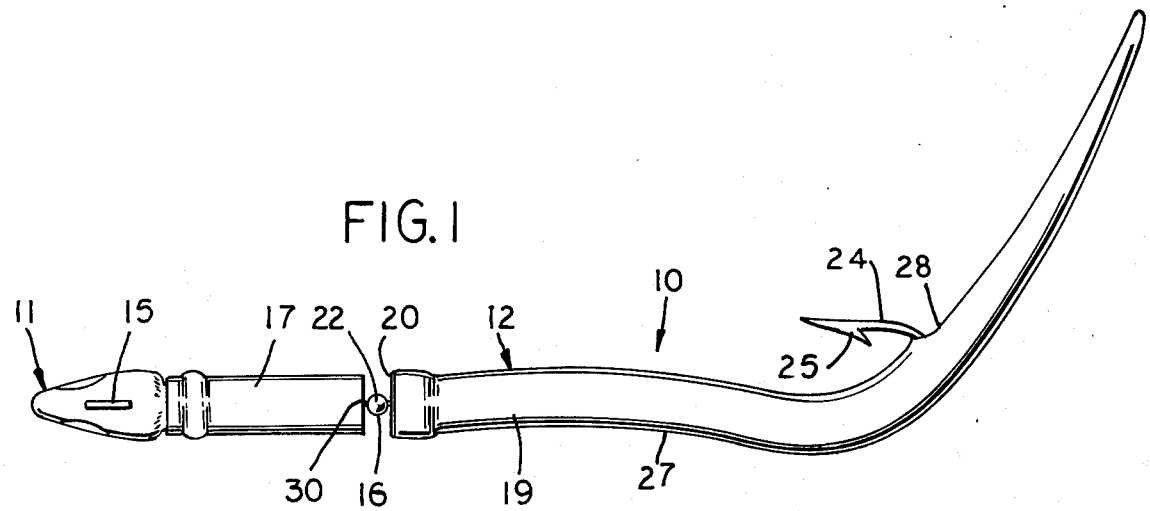
FIG. 1 is a plan view of a lure of the present invention.

The lure 10 of the present invention as shown in FIGS. 1 – 4 comprises a head 11 connected to a tail 12.

The head 11 preferably has a somewhat elongated shape, ending in a neck 13 with a collar 14. The head 11 is preferably weighted, cast of metal such as lead with a string attaching eye 15, preferably cast into the top of the head 11, and a short ball chain 16 extending from the neck 13.

A short piece of tubing 17, preferably rubber, extends from the collar 14 on the neck 13, forming a sleeve about most of the ball chain 16, or other simple swivel device.

Figure 2:
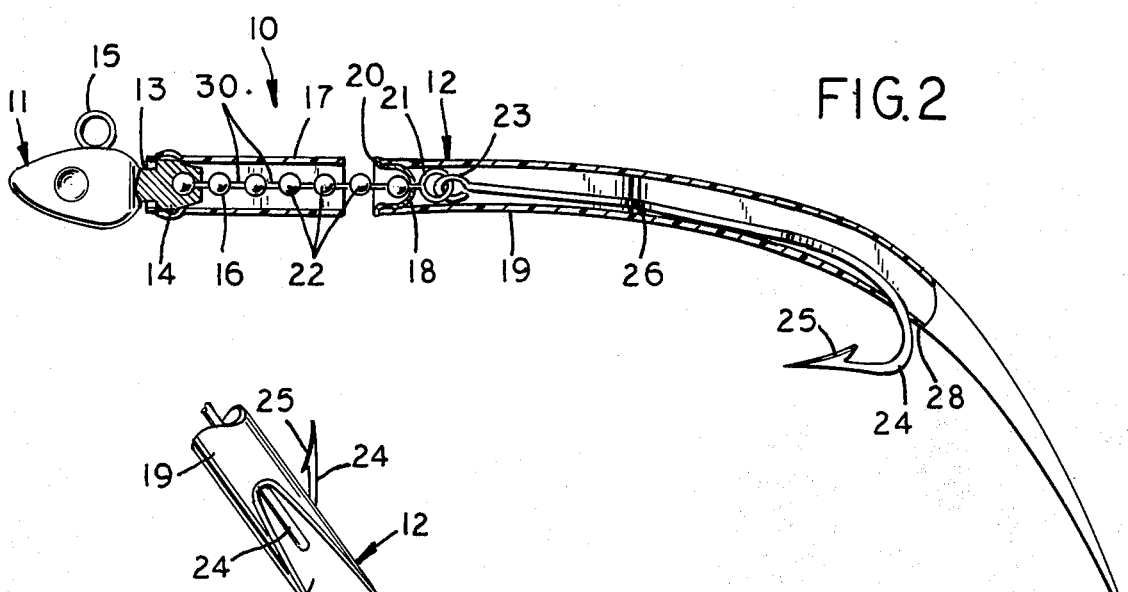
FIG. 2 is a side elevation of FIG. 1 cut away.

In a preferred embodiment as shown in FIGS. 1 and 2, the ball chain 16 extends on into a bell 18 enclosed in a long piece of tubing 19. The tubing 19 is preferably rubber and substantially defines the tail 12. The lip 20 of the bell 18 extends as a flange about the end of the tubing 19. An attaching eye 21 is linked through the bell 18 to a ball 22 in the chain 16. The eye 23 of a fishhook 24 is closed around the attaching eye 21. As shown in FIGS. 1 – 4, the barb 25 of the fishhook 24 extends from the tubing 19. The long tubing 19 is cut away longitudinally from where the barb 25 projects and tapered to form the point of the tail 12. A bend 26 in the hook 24 gives shape to the long tubing 19, putting a graceful bend 27 in the tubing 19 of the tail 12, so that it does not follow a straight line along its length. The graceful, but nonlinear shape facilitates rotation of the tail 12.

Figure 3:
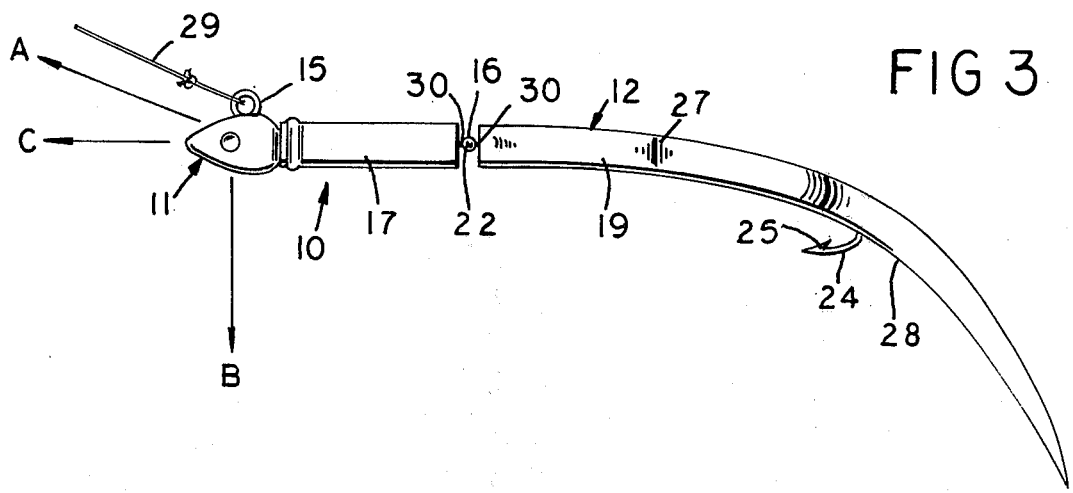
FIG. 3 is a slight variant of the lure of FIGS. 1 and 2 in use.
Figure 4:
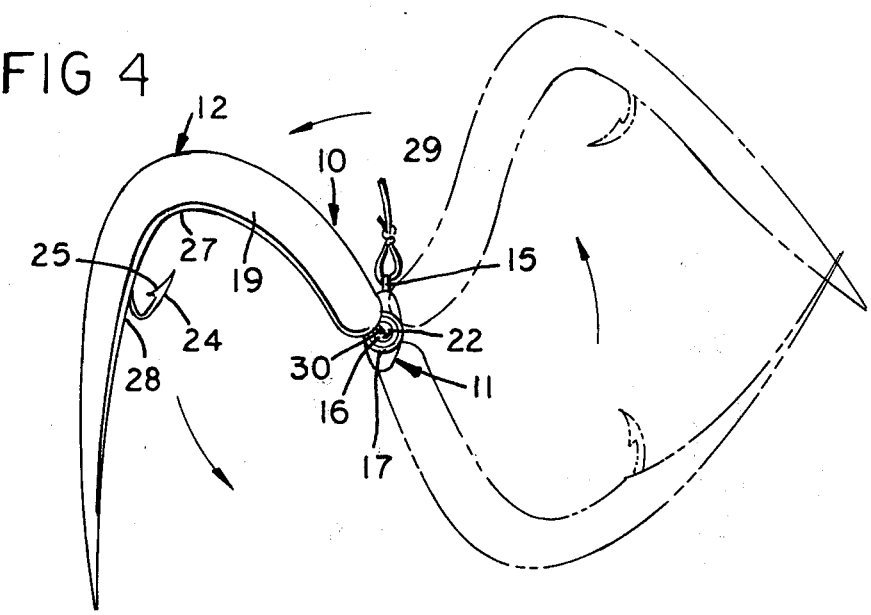
FIG. 4 is a right end view of FIG. 3.

In FIGS. 3 and 4 the lure 10 is substantially the same as the lure 10 of FIGS. 1 and 2, only the ball chain 16 is not held in a bell 18. Generally, the eye 23 of the hook 24, or the eye 21 on the ball chain 16 engages the inner walls of the long tubing 19, to keep the tubing 19 from slipping.

Figure 5:
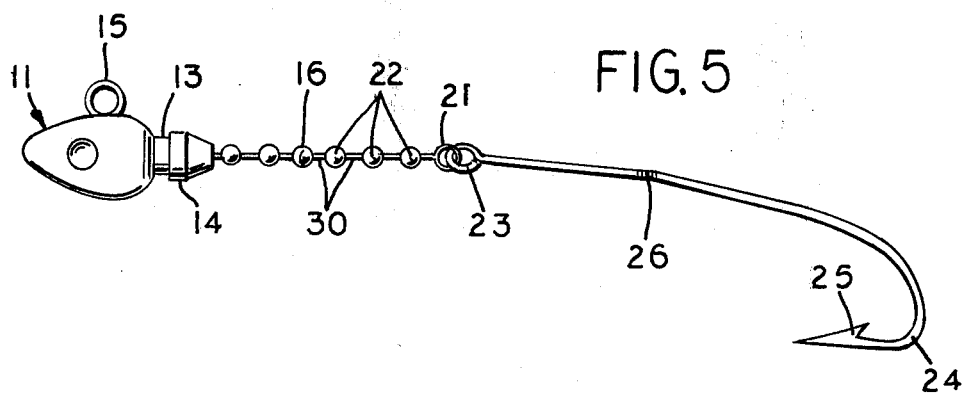
FIG. 5 is the inner construction of the invention of FIGS. 3 and 4.

In FIG. 5, the lure 10 of FIGS. 3 and 4 is shown free of the short tubing 17 and the long tubing 19.

Figure 6:
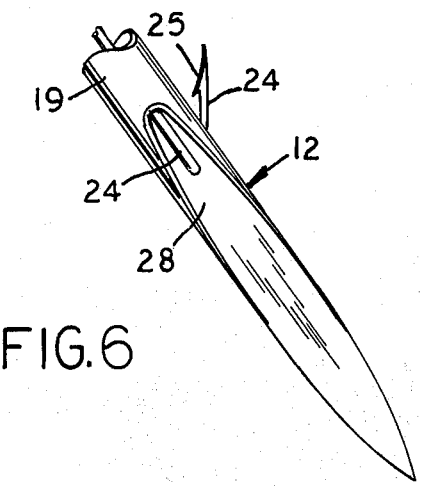
FIG. 6 is a variant of the hook portion of the present invention.

FIG. 6 shows a variant of the present invention where the hook 24 is extended through the tubing 19 rather than from the opening 28 formed by the cutting away of the tubing 19 to form the tapered point of the tail 12. Such configuration has the advantage of firmly holding the long tubing 19 in place without need for other support.

In operation, the lure 10 of the present invention has a line 29 fastened to the eye 15 on top of the head 11. The fisherman casts the lure 10 to his selected place, then draws the line in. The undulated shape of the tail 12 tends it to rotate as shown in FIG. 4. This rotation gives an optical illusion of the lure 10 wriggling back and forth like a swimming creature. Based on actual tests of the lure 10, it is believed that fish also see the optical illusion of a fish wriggling and strike at the lure 10.

The tail 12 rotates freely about the balls 22 of the chain 16, which are separated by spacers 30. In FIG. 2, the tubing 19 and chain 16 are held securely in the bell 18.

When the line 29 is hauled in, the tug on the line 29 is in the direction of arrow A. The weight of the head 11 gives it a gravitational vector in the direction of arrow B. The general result of these vectors is the tracking of the lure 10 in the direction of arrow C pretty much parallel to the surface of the water.

The shape of the head 11 is streamlined to flow smoothly through the water. Because the line 29 is attached to the eye 15 on top of the head 11, the head 11 is held steady. Torque from the rotation of the tail 12 does not wind up the line 29, tending to foul it. Rotating lures of the past generally were attached to line at their extremities. Notwithstanding swivels or other devices to facilitate rotation, rotation was easily transmitted to the line, making it easy to foul.

Lures of the past, fastened to line at the extremity of the lure, received a full tug in the direction of arrow A in FIG. 3, thus giving only a short tracking time parallel to the surface or an angular rising toward the surface.

In the past, lures with a line attached at the lure's extremity received a direct pull on the front or head at the angle that the line was deployed. Thus, any weight of the head was immediately overcome so that the lure had no vector in the direction of arrow B in FIG. 3. Thus, such lures of the past tended to pull out of the water and have little, if any, horizontal track.

Although the lure 10 of the present invention eventually rises out of the water as it nears the fisherman hauling in the line 29, the lure 10 has a prolonged horizontal track over prior art lures.

The terms and expressions which are employed are used as terms of description; it is recognized, though, that various modifications are possible.

Having thus described certain forms of the invention in some detail, what is claimed is:

1. An improved fishing lure including a head, said head being weighted, line attaching means on said head, said line attaching means on the top of said head, said head including a neck, a ball chain extending from said neck, a sleeve on said neck extending from said head, said sleeve surrounding at least part of said ball chain, a tail, said tail including a hook, said hook rotatably joined to said ball chain, a sleeve surrounding at least part of said hook contiguous with said head portion, said hook sleeve and said hook in a nonlinear shape adapted to rotate about said ball chain.

2. The invention of claim 1 including a bell portion, said bell portion surrounding part of said ball chain with a ring extending from the closed end of said bell.

3. The invention of claim 2 wherein said bell includes a lip-like flange, said sleeve including one end over said bell and said end of said sleeve abutting said lip-like flange.

* * * * *